United States Patent [19]

McGregor et al.

[11] 4,374,221

[45] Feb. 15, 1983

[54] HIGH SOLIDS POLYAMIDE-IMIDE MAGNET WIRE ENAMEL

[75] Inventors: Charles W. McGregor; Stephen E. Summers, both of Fort Wayne, Ind.

[73] Assignee: Essex Group, Inc., Fort Wayne, Ind.

[21] Appl. No.: 322,114

[22] Filed: Nov. 17, 1981

[51] Int. Cl.³ .............................................. C08K 5/34
[52] U.S. Cl. ........................................ 524/94; 528/45; 528/73; 525/241; 427/118; 428/379
[58] Field of Search ......................... 525/241; 528/45; 524/94; 427/118; 428/379

[56] References Cited

U.S. PATENT DOCUMENTS 3,997,513 12/1976 Noda et al. ............................ 528/45
4,088,637 5/1978 Zecher et al. ......................... 528/45
4,296,229 10/1981 Pauze et al. .......................... 528/45

*Primary Examiner*—Joseph L. Schofer
*Assistant Examiner*—N. Sarofim
*Attorney, Agent, or Firm*—Harry J. Gwinnell

[57] ABSTRACT

A high solids content, low molecular weight polymer, low viscosity polyamide-imide enamel is described. The enamel is a reaction product of polyisocyanate, trimellitic anhydride, and an isocyanate blocking alcohol having a ratio of free isocyanate to total carboxyl and anhydride groups of 0.99:1 to 0.85:1. The method of making the enamel and the method of coating electrical conductors such as magnet wire with such enamel are also disclosed.

23 Claims, No Drawings

HIGH SOLIDS POLYAMIDE-IMIDE MAGNET WIRE ENAMEL

TECHNICAL FIELD

The field of art to which this invention pertains is nitrogen containing polymers derived from carboxylic acids, anhydrides and polyisocyanates, and more particularly polyamide-imide magnet wire enamels.

BACKGROUND ART

Amide-imide polymers have been widely accepted in the magnet wire and insulation field because of their easy processability and good insulating properties. For example, in addition to providing adequate insulation in an electrical environment, such polymers are known to have good high temperature stability as well. Such polymers are typically used in a two-coat construction as an overcoating on magnet wires coated with cross-linked polyester materials. This provides thermal stability and solvent resistance to the magnet wire not provided by the polyester alone.

Typical synthesis for producing such amide-imide polymers includes the reaction of trimellitic anhydride with 4,4'-diisocyanato-diphenylmethane in a water free solvent system such as N-methyl pyrrolidone and xylene as follows:

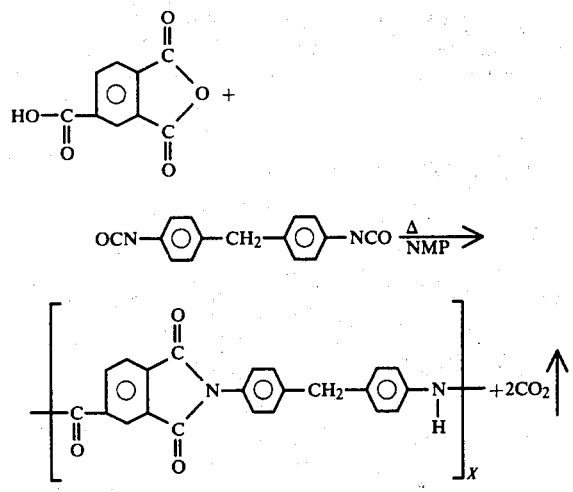

This synthesis is taken to a relatively high molecular weight in order to obtain a polymer with the required thermal, chemical and mechanical properties necessary for an acceptable magnet wire enamel. Note U.S. Pat. Nos. 3,541,038; 3,592,789; 3,790,530; 3,843,587; and 4,259,221. Another reason that this synthesis is generally continued to a relatively high molecular weight of polymer is due to the fact that unreacted isocyanate groups will readily react even at low temperatures with any material with an active hydrogen (for example, water) and thus, prevent further molecular weight increase during cure.

However, one problem resulting from the high molecular weight synthesis is that the resulting polyamide-imide enamels have relatively low polymer solids content and relatively high enamel viscosities. Because of the high enamel viscosity and low enamel solids content large amounts of costly organic solvents such as N-methyl pyrrolidone and other hydrocarbon solvents must be employed for magnet wire application.

Another problem resulting from the high molecular weight synthesis is that the high molecular weight polymer also makes complete solvent removal difficult during cure after the polymer is applied to the wire. Trapped solvent in the polymer can cause loss of magnet wire properties and/or a blistered non-smooth coating surface on wire.

Accordingly, if a synthesis method could be found that restricts polymer molecular weight growth to a level that results in an enamel of higher solids content while maintaining an enamel viscosity in a desirable range for application, and at the same time further polymer polymerization and increase in molecular weight could be obtained during cure on the wire thus obtaining desirable magnet wire properties, an improved enamel would result with a much reduced wire manufacturing cost.

DISCLOSURE OF INVENTION

The present invention is directed to a method of making a magnet wire insulation enamel solution of relatively high solids content and relatively low viscosity by restricting the polymer molecular weight growth during synthesis. The high solids content and relatively low viscosity are accomplished by selectively blocking a portion of the isocyanate functionality of the diisocyanate reactant. This effectively changes the reactants stoichiometry from the conventional 1:1 (acid and anhydride groups: isocyanate groups) to 1: less than 1 and restricts molecular weight growth during synthesis by selecting a blocking agent which will only unblock at temperatures above the maximum polymer synthesis temperature. The unblocked isocyanate functionality is subsequently reacted with carboxylic acid and anhydride groups to form a lower molecular weight polyamide-imide enamel that contains the blocked isocyanate functionality as well as unreacted carboxylic acid functionalities. The lower molecular weight polyamide-imide has the ability to further polymerize on wire during the application cure by means of the unblocking of the blocked isocyanate functionality and its subsequent reaction with available carboxylic acid groups on the polymer chain. This further polymerization on wire results in a higher molecular weight polyamide-imide with desirable magnet wire properties. The polymer forming reaction is shown below by formula I, and the blocking and unblocking reaction shown by formula II.

I.

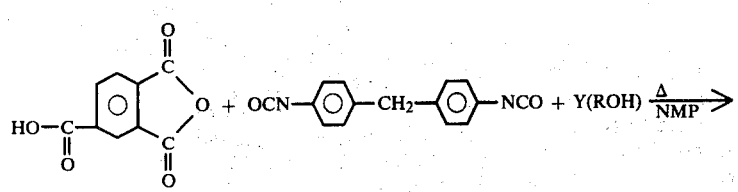

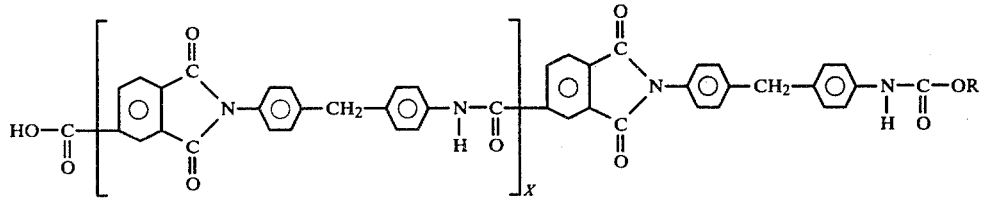

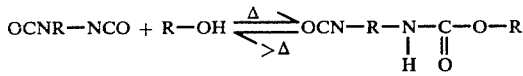

Relatively low molecular weight polymers are formed by this reaction (I) which are unblocked and further polymerized to higher molecular weight on wire after application and during cure.

Another aspect of the invention includes a coating process of applying the thus formed wire enamel to a magnet wire which may optionally be previously undercoated with another insulation coating.

Another aspect of the invention includes synthesis methods for making such enamel.

The foregoing, and other features and advantages of the present invention will become more apparent from the following description.

BEST MODE FOR CARRYING OUT THE INVENTION

As described above, the basic reaction for forming the polyamide-imide wire enamels is as follows:

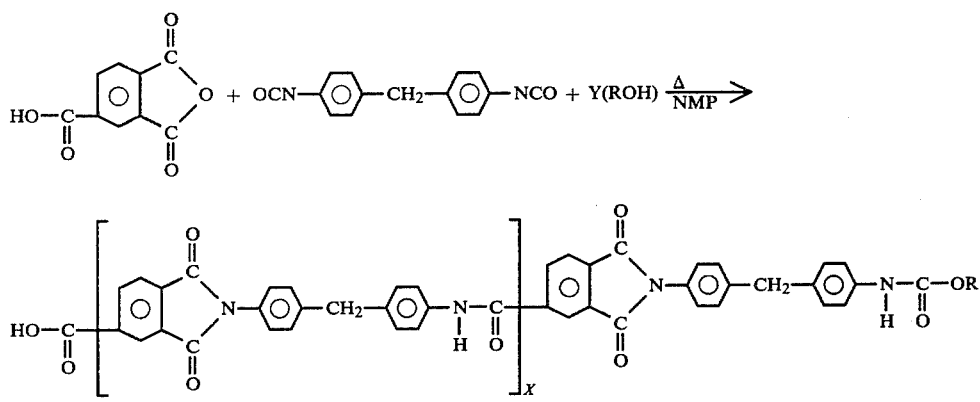

Where R, X and Y are as defined above.

By blocking about 1% to 15% of the isocyanate functionality with about 2.7% to about 3.7% being preferred, according to reaction (II) above the relatively lower molecular weight polymer can be produced resulting in a higher solids content, lower viscosity enamel. However, the unblocking mechanism of the blocked isocyanate enables the polymer to further advance in molecular weight during the application cure on the wire in order to obtain the high molecular weight polymer necessary for desirable magnet wire properties.

Generically, the relatively low molecular weight polymer forming reaction can be described as the reaction product of a carboxylic anhydride, a polyisocyanate, and a polyisocyanate blocked to monoisocyanate functionality. The generic formula for carboxylic anhydride reactants useful according to the present invention is:

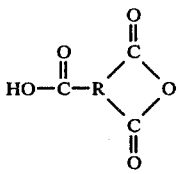

where R is at least trivalent and includes such things as: trimellitic anhydride; 2,6,7-naphthalene tricarboxylic anhydride; 3,3'4-diphenyl tricarboxylic anhydride; 3,3'4-benzophenone tricarboxylic anhydride; 1,3,4-diphenyl tricarboxylic anhydride; diphenyl sulfone 3,3'4-tricarboxylic anhydride; 3,4,10-perylene tricarboxylic anhydride; 3,4-dicarboxyphenyl 3-carboxyphenyl ether anhydride; ethylene tricarboxylic anhydride; 1,2,5-naphthalene tricarboxylic anhydride, etc.

As the isocyanate component, any polyisocyanate with at least 2 isocyanate groups having the generic formula

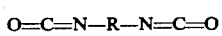

where R is an organic radical, may be used, such as:
tetramethylenediisocyanate
hexamethylenediisocyanate
1,4-phenylenediisocyanate
1,3-phenylenediisocyanate
1,4-cyclohexylenediisocyanate
2,4-tolylenediisocyanate
2,5-tolylenediisocyanate
2,6-tolylenediisocyanate
3,5-tolylenediisocyanate
4-chloro-1,3-phenylenediisocyante
1-methoxy-2,4-phenylenediisocyanate 1-methyl-3,5-diethyl-2,6-phenylenediisocyanate
1,3,5-triethyl-2,4-phenylenediisocyanate
1-methyl-3,5-diethyl-2,4-phenylenediisocyanate
1-methyl-3,5-diethyl-6-chloro-2,4-phenylenediisocyanate
6-methyl-2,4-diethyl-5-nitro-1,3-phenylenediisocyanate
p-xylylenediisocyanate
m-xylylenediisocyanate
4,6-dimethyl-1,3-xylylenediisocyanate
1,3-dimethyl-4,6-bis-(b-isocyanateoethyl)-benzene
3-(a-isocyanatoethyl)-phenylisocyanate
1-methyl-2,4-cyclohexylenediisocyanate4,4'-biphenylenediisocyanate
3,3'-dimethyl-4,4'-biphenylenediisocyanate
3,3'-dimethoxy-4,4'-biphenylenediisocyanate
3,3'diethoxy-4,4'-biphenylenediisocyanate
1,1-bis-(4-isocyanatophenyl)cyclohexane
4,4'-diisocyanato-diphenylether
4,4'-diisocyanato-dicyclohexylmethane
4,4'-diisocyanato-diphenylmethane
4,4'-diisocyanato-3,3'-dimethyldiphenylmethane
4,4'-diisocyanato-3,3'-dichlorodiphenylmethane
4,4'-diisocyanato-diphenyldimethylmethane
1,5-naphthylenediisocyanate
1,4-naphthylenediisocyanate
4,4',4"-triisocyanato-triphenylmethane
2,4,4'-triisocyanato-diphenylether
2,4,6-triisocyanato-1-methyl-3,5-diethylbenzene
o-tolidine-4,4'-diisocyanato
m-tolidone-4,4'-diisocyanato
benzophenone-4,4'-diisocyanato
biuret triisocyanates
polymethylenepolyphenylene isocyanate The polyisocyanate blocked to a monoisocyanate can be formed from any of the polyisocyanates listed above. The blocking mechanism follows formula (II)

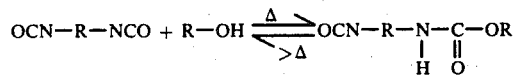

R = aromatic, aliphatic or cyclic hydrocarbon

The isocyanate blocking reaction is a conventional reaction in which the isocyanate and alcohol react on a 1:1 equivalent basis. The blocking reaction takes place at a relatively low temperature; that is, at a temperature that is less than the maximum temperature required for the polyamideimide synthesis. The unblocking reaction takes place at a relatively high temperature depending upon the blocking alcohol used, but generally at a temperature greater than the maximum polyamideimide synthesis temperature, the result being that the blocked isocyanate remains in the blocked form during polyamideimide synthesis and the mono functionality controls molecular weight build of the polymer during synthesis. The unblocking reaction occurs on wire during the application cure and results in further polymer polymerization to the relatively higher molecular weight needed for desireable magnet wire properties.

EXAMPLE 1

All percents below are percents by weight 45.46% N-methyl-pyrrolidone (NMP) was admixed with 11.37% of Solvesso 100 hydrocarbon. The mixture was heated and mixed under nitrogen until the water content was less than 0.04% as determined by Karl-Fisher Aqua Tester analysis. The mixture was cooled to 50° C. and 14.40% of trimellitic anhydride (TMA) and 18.75% of 4,4'-diisocyanatodiphenylmethane (MDI) were added respectively with mixing. The mixture was then heated over a two hour period to 95° C. and held at 95° C. until a % COOH of 10 was obtained as determined by titration with alcoholic KOH to a phenol red end point. At this point 0.50% of benzyl alcohol blocking agent was added. An exothermic reaction resulted and the temperature was allowed to increase to 105° C. where it was held for one hour. The temperature was then taken up to 155° C. over a two hour period and held at 155° C. until a enamel mix off viscosity of Z3 was obtained on the Gardner-Holdt scale at 30° C. The mix off viscosity sample was prepared by mixing 89.2 parts of the synthesized polymer solution with 4.5 parts NMP and 6.3 parts of Solvesso 100 solvent for an effective mixoff viscosity solids content of 30% to 32% when measured at 1 gram for 1 hour at 200° C. The mixture was then cooled to 120° C. and 4.30% NMP, 3.22% Solvesso 100, and 2.00% n-butyl alcohol were added. The resulting enamel had a solids content of 32.5% (1.00 gram, 1 hr. at 200° C.) and a Brookfield viscosity of 4500 cps at 30° C.

EXAMPLE 2

A polyamide-imide enamel was prepared as in Example 1 except that 39.05% NMP and 6.90% Xylene were refluxed to 0.04% water content and 17.26% TMA, 22.47% MDI and 2.34% benzyl alcohol were reacted to a Gardner-Holdt viscosity of greater than Z6 at 30° C. and a % COOH of 2.4. The polymer solution was cooled to 120° C. and thinned with 5.54% NMP, 4.64% Xylene and 1.80% N-butyl alcohol. The resulting enamel had a solids content of 43.4% (1.00 g. 1 hr at 200° C.) and a Brookfield Viscosity of 3500 cps at 30° C.

EXAMPLE 3

An 18 A.W. gauge copper wire was coated with a conventional THEIC polyester which is a condensation polymer of ethylene glycol, trishydroxyethyl isocyanurate (THEIC) and dimethyl terephthalate. The polyester was cured in conventional manner to achieve a 2.6 mil build (increase in wire diameter due to coating) of the coating on the wire. The thus coated wire was then further coated with a conventionally prepared polyamide-imide enamel topcoat at 24.5% solids and 2500 cps. The polyamide-imide topcoat was also cured in conventional manner for a total build of coating of 3.2 mils.

Second and third wires were made in similar manners except that this standard polyamide-imide topcoat was replaced by the enamels of examples 1 and 2 respectively. A comparison of properties is shown in Table I.

EXAMPLE 4

An 18 A.W. guage copper wire was coated in eight passes with a conventionally prepared polyamide-imide enamel of 24.5% solids and 2500 cps. The enamel was cured in a twenty foot gas fired oven with bottom and top heating zones of 620° F. and 840° F. respectively. A second wire was made in a similar manner except the enamel of Example 1 was used instead of the conventionally prepared polyamide-imide enamel. A comparison of properties is shown in Table II.

As is evident from Tables I and II, the cured wire properties of polyamide-imide enamels of the present invention are comparable to those obtained when using a conventional polyamide-imide enamel. However, the reduced cost and application advantages of the present invention that allows a lower molecular weight polymer to be synthesized with a resulting higher solids content enamel at a relatively lower viscosity over a conventional higher molecular weight, lower solids polyamide-imide enamel is readily apparent to those skilled in this art. While specific molecular weights are difficult to measure analytically, Intrinsic Viscosity measurements made in NMP of a conventional high molecular weight polyamide-imide versus the polymers of Examples 1 and 2 were 0.50, 0.36, 0.20 deciliters per gram respectively. Based on these measurements it is believed that for the isocyanate blocking range of about 1% to about 15% Intrinsic Viscosities of about 0.15 to about 0.42 would be obtained. Further, molecular weight distribution curves of the three polymer systems above obtained by Liquid Chromatography (LC) also showed the same order of molecular weight, i.e. conventional polyamide-imide was greater than Example 1 which was greater than Example 2.

Generally, as described above it is preferred to form the enamel according to the present invention (enamel referring to the polymer in solution prior to curing an wire unless otherwise indicated) by reacting isocyanates such as MDI with isocyanate blocking agents (sufficient to block about 1% to about 15% of the free isocyanate groups) and then with carboxylic anhydrides such as TMA (to a Gardner-Holdt mix off Viscosity at 30% to 32% solids of Z1 to Z5 at 30° C.

TABLE I

|  | Standard AI Topcoat 24.5% solids 2500 cps | Example 1 Topcoat 32.5% solids 4500 cps | Example 2 Topcoat 43.4% solids 3500 cps |
| --- | --- | --- | --- |
| Wire Coating Speed | 56 ft/min | 56 ft/min | 56 ft/min |
| Smoothness | Good | Good | Good |
| Build (2× coating thickness) | 3.2 mils | 3.2 mils | 3.2 mils |
| Flexibility Snap and Mandrel | 3× | 3× | 3× |
| Heat Shock 20% + 3× 250° C. Modified | Pass | Pass | Pass |
| Unilateral Scrape 28# | Pass | Pass | Pass |
| Thermoplastic Flow °C. | 380° + | 380° + | 380° + |

TABLE II

|  | Standard 24.5% 2500 cps | Example 1 32.5% 4500 cps |
| --- | --- | --- |
| Wire Speed FPM | 56 | 56 |
| Smoothness | Good | Good |
| Dissipation Factor at 240° C. | 22.0 | 14.0 |
| Build | 3.2 | 3.3 |
| Flex. 25% + 3× | OK | OK |
| Dielectric Strength, Volts/Mil | 4094 | 3707 |
| Thermoplastic Flow °C. | 345° C. | 364° C. |
| Heat Shock 20% + 3× 250° C. | OK | OK |
| Unilateral Scrape gm/mil | 428 | 423 |

However, other reaction schemes which can be used to produce this same result (i.e. low molecular weight, high solids content, low viscosity polyamide-imide enamel) include reacting the MDI with the blocking alcohol first then adding the TMA and synthesizing the polymer to the desired mix off viscosity range as explained in Example 1 and then cooling and cutting the mixture with the solvent and diluent as in Example 5; and reacting the MDI with the TMA to the desired molecular weight (as measured by Gardner-Holdt mix off viscosity at 30° C.) where free isocyanate groups are still available and then adding sufficient blocking agent to block the remaining isocyanate groups to terminate molecular weight build and then cooling and cutting the mixture with the solvent and diluent as in Example 6.

EXAMPLE 5

45.46% NMP was mixed with 11.37% of Solvesso 100 hydrocarbon. The mixture was heated to reflux and stirred under nitrogen until the water content was less than 0.04% and cooled to 100° C. 0.50% Benzyl alcohol and 18.75% MDI were added respectively with mixing. The mixture was held at 100° C. for one hour and then cooled to 50° C. 14.40% of TMA was then added and the solution was heated over a six hour period to 165° C. until an enamel mixoff (as described in Example 1) viscosity of a Gardner-Holdt Z3 was obtained. The mixture was then cooled to 120° C. and 4.30% NMP, 3.22% Solvesso 100, and 2.00% N-Butyl alcohol were added. The resulting enamel had a solids content of 33.8% (1.00 g, 1 hr at 200° C.) and a Brookfield Viscosity of 5700 cps at 30° C.

EXAMPLE 6

44.81% NMP was mixed with 11.21% of Solvesso 100 hydrocarbon. The mixture was heated to reflux and stirred under nitrogen until the water content was less than 0.04% and cooled to 50° C. as in Example 1. 14.20% TMA and 18.48% MDI were added respectively with mixing. The mixture was then heated over a five hour period to 155° C. and held at 155° C. to 160° C. until an enamel mixoff (as explained in Example 1) viscosity of a Gardner-Holdt Z3½ was obtained. A mixture of 4.11% NMP, 5.14% Solvesso 100, and 2.05% Benzyl alcohol was added and the mixture was cooled to room temperature. The resulting enamel had a solids content of 32.6% (1.00 g, 1 hr at 200° C.) and a Brookfield viscosity of 5600 cps at 30° C.

The temperature at which the alcohol unblocks varies depending on the alcohol used. It is most advantageous to use an alcohol blocking agent that does not unblock at temperatures below the maximum polymer synthesis temperature of about 160° C., but that does unblock readily during solvent evaporation of the application cure cycle. Butyl alcohol, cyclohexyl alcohol, and benzyl alcohol have been found to be particularly suitable, with benzyl alcohol being most preferred in view of its boiling point of 205° C. which is above the maximum polyamide-imide synthesis temperature of 160° C. and near the boiling point of the enamel solvent NMP which is 202° C. It should also be noted that while the preferred blocking agents are the alcohols described above any conventional blocking agents which similarly perform can be used, e.g. such as caprolactam.

While the polymers according to the present invention can be used on any electrical conductor, they are preferably used on wires and specifically magnet wires. The wires are generally copper or aluminum. And wires ranging anywhere from 4 AWG to 42 AWG (American Wire Gauge) in diameter are coated, with 18 AWG being the most commonly coated wire. Wire coatings can be anywhere from 0.2–5 mils or any thickness desired, and preferably about 3.2 mils on 18 AWG wire when applied in 6 coatings of equal thickness with curing between coats. The coatings can be used as a sole insulation coat or part of a multicoat sytem in combination with other conventional polymer insulation, such as polyesters, polyurethanes, polyvinyl formal, polyimides, etc., and combinations thereof. The polymer coatings of the present invention can also contain lubricants either externally on the coating, internally in the coating, or both. Note commonly assigned, copending U.S. patent applications Ser. Nos. 312,582 and 312,215 filed Oct. 19, 1981, and Ser. No. 310,681 filed Oct. 13, 1981, the disclosures of which are incorporated by reference. In such multicoat systems the polyamide-imide preferably represents about 10% to about 30% of the total coating weight.

The enamels made according to the present invention can be applied by any conventional means such as coating dies, roller or felt application with viscosity adjustments made accordingly. Viscosity adjustments can be made by dilution with appropriate enamel solvents, or diluents for any coating method, the enamel of the present invention still providing higher solids content at a given viscosity even accounting for adjustment, regardless of application method. As the enamel solvents, any conventionally used relatively inert polar solvents such as N-methyl pyrcolidone, N,N-dimethyl or N,N-diethyl formamide, and N,N-diethyl acetomide can be used and similar any conventional hydrocarbon diluent such as xylene Solvesso 100 (Exxon) or D59 hydrocarbon (Drake Petroleum Co.).

Conventional curing ovens can be used to heat treat the coated magnet wire. Inlet oven temperatures of the order of about 500°–700° F. (260° C.–371° C.), preferably about 580° F. (304° C.) and outlet oven temperature of about 800°–1100° F. (427°–593° C.), and preferably about 900° F. (482° C.) are used for drying and curing.

While this invention has been described in terms of magnet wire insulation, this invention includes the use of this material as a free standing film, e.g. for such uses as phase insulation, coil wrapping, etc., and as varnishes for uses other than magnet wire insulation.

As discussed above, in addition to the cost saving advantages of employing enamels according to the present invention, significantly more of the polymer formation takes place on the magnet wire than in the reaction vessel as compared to conventionally prepared polyamide-imide enamels. This not only provides for a better product by virtue of better controlling the reaction during synthesis (less tendency to gel) but results in smoother solvent (and diluent) removal during drying and curing of the enamel since there is less tendency for trapping of solvent resulting in smoother coatings with less tendency to blister or form beads. Furthermore, using less solvent per application because of higher solids at lower viscosity results in less solvent being removed in the bake cycle and therefore less polluting effects.

Although this invention has been shown and described with respect to detailed embodiments thereof, it will be understood by those skilled in the art that various changes in form and detail thereof may be made without departing from the spirit and scope of the claimed invention.

We claim:

1. A magnet wire enamel comprising a high solids, low viscosity, low molecular weight polymer solvent solution of the reaction product of a polyisocyanate, an isocyanate blocking alcohol and trimellitic anhydride, the ratio of free isocyanate groups to total anhydride and carboxyl groups in the reaction product being about 0.99:1 to 0.85:1.

2. The enamel of claim 1 wherein the polyisocyanate is 4,4'-diisocyanato-diphenylmethane.

3. The enamel of claim 1 wherein the isocyanate blocking alcohol is benzyl alcohol.

4. The enamel of claim 1 wherein the solvent is N-methyl-pyrrolidone.

5. The enamel of claim 1 having a solids content up to 50% by weight at 200° C.

6. The enamel of claim 1 having a solids content of about 28% to about 45% by weight at 200° C.

7. The enamel of claim 1 having a viscosity less than 50,000 cps at 30° C.

8. The enamel of claim 1 having a viscosity of 2000 cps to 15000 cps at 30° C.

9. A method of coating an electrical conductor comprising applying a high solids low viscosity, low molecular weight solvent solution of the reaction product of a polyisocyanate, and isocyanate blocking alcohol and trimellitic anhydride, the ratio of free isocyanate groups to total anhydride and carboxyl groups in the reaction product being about 0.99:1 to 0.85:1.

10. The method of claim 9 wherein the polyisocyanate is 4,4'-diisocyanato-diphenylmethane.

11. The method of claim 9 wherein the isocyanate blocking alcohol is benzyl alcohol.

12. The method of claim 9 wherein the solvent is N-methyl-pyrrolidone.

13. The method of claim 9 wherein the solution has a solids content up to 50% by weight at 200° C.

14. The method of claim 9 wherein the solution has a solids content of about 28% to about 45% by weight at 200° C.

15. The method of claim 9 wherein the solution has a viscosity less than 50,000 cps at 30° C.

16. The method of claim 9 wherein the solution has a viscosity of 2000 cps to 15,000 cps at 30° C.

17. The method of claim 9 wherein the conductor is magnet wire having a basecoat of polyester thereon.

18. A method of making a high solids content, low viscosity magnet wire enamel comprising reacting trimellitic anhydride with a polyisocyanate and an isocyanate blocking alcohol to form a reaction product in solution having a ratio of free isocyanate groups to total anhydride and carboxylic groups of about 0.99:1 to 0.85:1.

19. The method of claim 18 wherein the trimellitic anhydride is reacted with the polyisocyanate until a percent carboxyl of 10 is obtained in the reaction product, reacting sufficient isocyanate blocking alcohol with the thus formed reaction product to produce a second reaction product having a ratio of free isocyanate groups to total anhydride and carboxyli groups in the second reaction product of about 0.99:1 to about 0.85:1, further reacting by heating the second reaction product until it attains a Gardner-Holdt mix off Viscosity at 30° C. of Z1 to Z5 at 30% to 32% solids by weight.

20. The method of claim 18 wherein the polyisocyanate is reacted with an isocyanate blocking alcohol to block about 1% to about 15% of the free isocyanate groups.

21. The method of claim 18 wherein the trimellitic anhydride is reacted with the polyisocyanate until a Gardner-Holdt mix off Viscosity at 30% to 32% solids by weight at 30° C. of Z1 to Z5 is reached, and reacting thus formed reaction product with sufficient isocyanate blocking alcohol to block the remaining free isocyanate functionality.

22. The method of claims 18, 19, 20 or 21 wherein the polyisocyanate is 4,4'-diisocyanato-diphenylmethane.

23. The method of claims 18, 19, 20 or 21 wherein the isocyanate blocking alcohol is benzyl alcohol.

* * * * *